United States Patent [19]

Andersen

[11] 4,045,309
[45] Aug. 30, 1977

[54] METHOD FOR MEASURING AND CONTROL OF THE ENERGY IN ALUMINUM REDUCTION CELLS

[75] Inventor: Jens Arvid Andersen, Kolbotn, Norway

[73] Assignee: Norsk Hydro a.s, Oslo, Norway

[21] Appl. No.: 675,568

[22] Filed: Apr. 9, 1976

[30] Foreign Application Priority Data

Apr. 10, 1975 Norway .................................. 751256

[51] Int. Cl.$^2$ ......................... C25C 3/06; C25D 17/00
[52] U.S. Cl. ...................................... 204/67; 204/225
[58] Field of Search .......................... 204/67, 225, 228

[56] References Cited

U.S. PATENT DOCUMENTS

| | | | |
|---|---|---|---|
| 1,396,919 | 11/1921 | Brace | 204/228 |
| 2,930,746 | 3/1960 | Cooper | 204/228 |
| 3,756,929 | 9/1973 | Hatting et al. | 204/67 |
| 3,951,763 | 4/1976 | Sleppy et al. | 204/67 |

*Primary Examiner*—John H. Mack
*Assistant Examiner*—H. A. Feeley
*Attorney, Agent, or Firm*—Wenderoth, Lind & Ponack

[57] ABSTRACT

The energy balance in an aluminum reduction cell is controlled by measuring the temperature of the side lining of the cell, preferably at the level of the surface of the electrolyte, comparing the measured temperature with a reference temperature, and when the difference between the measured and reference temperatures exceeds a given value adjusting the depth of immersion of the cell anodes within the electrolyte.

4 Claims, 1 Drawing Figure

METHOD FOR MEASURING AND CONTROL OF THE ENERGY IN ALUMINUM REDUCTION CELLS

BACKGROUND OF THE INVENTION

This invention relates to the electrolytic reduction of alumina to aluminum metal in a Hall-Heroult reduction cell, and more specifically, to a method for controlling the energy balance in such cells.

It is known that magnetic forces can cause considerable problems in such cells, particularly when the cell current exceeds 100 kA. The primary effect of the magnetic forces is their influence on the flow of the molten metal and bath, and on the curvature of the metal surface. Under extreme conditions the magnetic forces, combined with gravity forces, can cause waves in the metal.

The magnetic forces acting on the bath and metal are equal to the vector product of the magnetic induction $\bar{B}$ and the current density $\bar{G}$.

The magnetic induction will be a function of the construction and location of the busbar system, and the current distribution in the cell. The current distribution will depend on the busbar system, but also to a large degree on the geometry and thickness of the side-crust which gradually builds up during the operation of the cell. Thus there is considerable connection between the existing geometry of the side-crust and the magnetic forces, and therefore the fluid flow and the metal curvature.

It can be shown by means of mathematical models that there is a very close connection between the thickness of the side-crust and the curvature of the metal surface. A change in the metal surface curvature will, if it proceeds rapidly enough, influence the local interpolar distance and consequently the current distribution in the cell.

The dynamic behaviour of the side-crust is assumed to be different in the electrolytic bath phase and the metal phase. While the side-crust in the metal phase will be more or less covered with sludge, the side-crust in the bath phase will mainly consist of cryolite. The geometry of the ledge below the metal surface will thus be determined partly by design and partly by thermal and operational conditions, since the formation of the sludge is assumed to be caused by the feeding of more oxide to the bath than can be dissolved in a sufficiently short period of time.

The thickness of the ledge or side-crust in the electrolytic phase on the other hand is mainly determined by the thermal balance of the cell. If the cell is fed with more energy than it radiates the ledge will melt, so that the so-called force-free side channels of the cell will expand, while the opposite will be the case if the energy balance is negative.

Thermally stable operation of the cells is thus of vital importance. In practice stable thermal operation has been maintained by adjusting the cell voltage in accordance with experience to a level which gives stable operational conditions. Further, it has previously been proposed to use automatic control systems based on the measuring and control of the cell voltage. However, not all cells are alike. This is due to ageing processes in the pot insulation, cracks and consequent penetration of metal, and also because no two cells can be operated in exactly the same way. Fortunately, the cells have an automatic thermal control mechanism in the side-crust, this becoming thinner when the thermal load on the cell is increased with the consequence that the losses are also increased, the opposite being the case if the thermal load is decreased, but this will at the same time influence the geometry of the cell.

If, for instance, too much freezing occurs, the flow patterns will be radically changed. The freezing of the ledge in the bath phase in particular may prevent the flow of the electrolyte which, due to the low thermal conductivity of the bath, may result in local overheating. For the abovementioned reasons active control of the energy balance of the cell is necessary. Hitherto the problem has been to find out how to measure the state of this energy balance. In some early known systems, where computer control is used, the use of the so-called resistance noise is proposed as a criterion, on the theory that the cell is in the process of becoming too cold. However, hitherto no direct connection between this kind of noise and the heat balance has been proven.

It might perhaps be believed that the problem would be solved if the bath temperature could be measured, either continuously or sampled at given intervals. However, the bath temperature will to a great extent follow the liquidus temperature of the ledge, which again is a function of the aluminum oxide concentration. While the difference between the bath temperature and liquidus temperature will be in the range of 10° C - 30° C, the liquidus temperature, as a consequence of normal variations of the oxide concentration, will change approximately 20° C - 40° C. Therefore, the bath temperature alone will for this reason only give unique information about the heat balance when operational conditions are extreme.

It has been shown by means of a dynamic mathematical model of an aluminum electrolytic cell that excess or insufficient heat will first of all result in heat losses through that part of the cell walls which is covered by dissolvable side-crust. In the model cell for instance, increased energy input was simulated by an increase in the bath temperature of 10° C above a stable state of 1000° C, whereafter 96 hours of operation was simulated. After the abovementioned period the heat losses per unit area from the cell bottom had increased by less than 1%, while the heat flow from the sides at bath level had increased by 28%. At the same time the temperature in the carbon lining at bath level increased by 40° C. Considering the fact that the temperature in the carbon lining is approximately 200° C - 300° C it will be understood that the carbon lining is a measuring location which is very sensitive to thermal imbalance in the cell. At the same time it is a location where the environmental requirements with respect to performance of a measuring probe are moderate.

SUMMARY OF THE INVENTION

This phenomenon is, in accordance with the invention, utilised to provide a method to measure and control the energy balance, in that the temperature in the cell lining is measured by one or more thermoelements located in the cell lining, preferably at the same level as the electrolyte, whereafter the measured temperature, corrected if necessary for noise caused by the feeding of oxide and/or an external change in temperature, is compared with a reference temperature, the anode level being adjusted when the difference between the measured temperature and the reference temperature exceeds a given value.

BRIEF DESCRIPTION OF THE DRAWING

The invention will be described in more detail below, in connection with a preferred embodiment thereof, and with reference to the accompanying drawing wherein the single FIGURE is a schematic outline of a system illustrating a manner of carrying out the process of the invention.

DETAILED DESCRIPTION OF THE INVENTION

Figure 1:
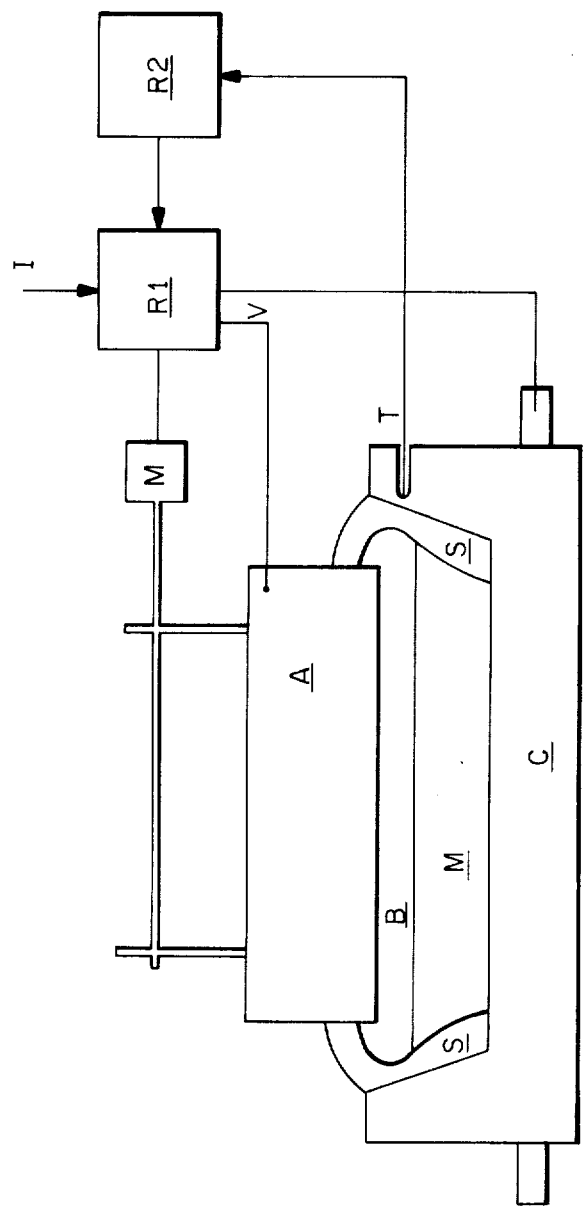

The drawing illustrates a conventional cell including an anode A, a cathode C, an electrolytic bath B, a metal bath M and a side-crust S. A motor M controls up and down movement of the anode, T is a thermoelement, and R1 and R2 are controllers or regulators.

Regulator R1 is in the form of a separate control loop which in accordance with measured cell voltage V and cell current I, adjusts the anode at differential resistance, $R_{diff}$ defined by the equation $$R_{diff} = \frac{V - Vk}{I} ;$$

where Vk represents the sum of the decomposition potentials, and the anodic and cathodic over-potentials, normally inserted as 1.7 V.

Regulator R2 is in the form of an outer control loop which, dependent on the measured lining temperature, controls the set-point of the regulator R1.

One problem with the temperature measurement is that a certain time lag is involved. Thus in the model cell, with an initial ledge thickness of 19 cm, it took approximately six hours before the rise in temperature in the lining could be detected. An approximately steady state was obtained after 96 hours. When the temperature measurement is used on a closed loop, for instance when the difference between the measured temperature in the carbon lining and a selected reference value is used, by means of a proportional plus integral regulator to control, the set-point of the anode regulator and thereby the input effect, the control will be especially effective for slow disturbances in the heat balance of the cell. Such a simple system will be unable to correct faster changes, which in this case means changes within a four-hour period. Slower variations, for instance those following ageing phenomena in the cell insulation, increased amount of sludge, etc. will be effectively compensated for by a control system based on the above principles. The choice of set-point in such a controller will, in principle, represent the choice of the cell voltage, which in the long run will give a certain thickness of the side-crust at the bath level. Obviously the selected reference temperature or value will be based on the properties of the specific cell, such as the cell insulation and the selected average thickness of the side-crust. The reference temperature can be approximately computed, but final adjustment may be necessary.

I claim:

1. A method for measuring and controlling the energy balance in an aluminum reduction cell of the type wherein anodes are immersed in an electrolyte within a cathode lining, and wherein during operation of the cell, crust is formed on the inner surface of the lining, said method comprising:

measuring the temperature of a side of said lining by means of at least one thermoelement located in said lining;

comparing the thus measured temperature with a reference temperature; and adjusting the immersion level of said anodes within said electrolyte when the difference between said measured temperature and said reference temperature exceeds a given value.

2. A method as claimed in claim 1, wherein said temperature is measured at the level of the surface of said electrolyte.

3. A method as claimed in claim 1, further comprising correcting said measured temperature for disturbances caused by the feeding of oxide.

4. A method as claimed in claim 1, further comprising correcting said measured temperature for external temperature variations.

* * * * *